United States Patent [19]
Thompson

[11] 3,877,812
[45] Apr. 15, 1975

[54] MULTIPLE WAVELENGTH SPECTROMETER

[75] Inventor: Duane T. Thompson, Norwalk, Conn.

[73] Assignee: Wilks Scientific Corporation, South Norwalk, Conn.

[22] Filed: Jan. 31, 1973

[21] Appl. No.: 328,240

[52] U.S. Cl. .................. 356/97; 250/233; 350/274; 350/315; 350/318; 356/51; 356/201
[51] Int. Cl. ............................. G01j 3/02; G01j 3/42
[58] Field of Search ......... 356/51, 83, 97, 100, 186, 356/188, 205; 250/226, 233; 350/273, 274, 315, 318

[56] References Cited
UNITED STATES PATENTS

| | | | |
|---|---|---|---|
| 3,472,595 | 10/1969 | Hashizume | 356/100 X |
| 3,529,889 | 9/1970 | de Mey | 350/318 X |
| 3,659,945 | 5/1972 | Roche et al. | 356/100 |
| 3,694,086 | 9/1973 | May | 356/51 |

Primary Examiner—Ronald L. Wibert
Assistant Examiner—F. L. Evans
Attorney, Agent, or Firm—Buckles and Bramblett

[57] ABSTRACT

There is disclosed a multiple wavelength infrared spectrometer. It includes an optical chopper and a pendulum-like filter carrier which inserts a plurality of filters sequentially into the radiation beam. Filter changes occur during an opaque period of the chopper and each filter remains in place for a predetermined number of radiation pulses. The radiation passes through the sample and onto a detector which produces an electrical signal. An electronic circuit operates upon the signal so produced to provide an output proportional to sample absorbance.

8 Claims, 4 Drawing Figures

PATENTED APR 15 1975

MULTIPLE WAVELENGTH SPECTROMETER

The foregoing abstract is not to be taken either as a complete exposition or as a limitation of the present invention. In order to understand the full nature and extent of the technical disclosure of this application, reference must be had to the following detailed description and the accompanying drawings as well as to the claims.

BACKGROUND OF THE INVENTION

This invention relates to the field of spectrometry and, more particularly, to single beam multiple wavelength analysis of sample materials.

It is often desirable to analyze a sample by measuring its absorption at more than one wavelength. Such an analysis can give much important information, both qualitative and quantitative. Furthermore, it is quite flexible. For example, one or more wavelengths may be chosen in the absorption region of the sample and another outside the absorption band. Such as analysis in a close approximation of a double beam analysis but with much simpler apparatus. Also, it is possible to compare absorption at two or more wavelengths and thereby acquire important information about the sample which is otherwise obtainable only with difficulty.

There are commercial spectrometers presently available which include choppers having opaque blades and filters between the blades. The detector of such an instrument sees alternating, separated pulses of the two (or more) wavelengths and produces a corresponding electrical output wherein the pulse height corresponds to radiation intensity. A demodulator then separates and ratios the intensities. In such a device, the filter is moving during each observation period. This creates a stability problem and also requires large areas of filter material. As these are usually interference filters, they are relatively expensive. Also, the number of different wavelengths is limited by the dimensions of the chopper. A high chopping frequency is desirable in order to achieve a good signal/noise ratio but it is not desirable to move the filters rapidly during the observations. Also, the chopper-filter in such a device is larger than would be desirable.

Accordingly, it is a primary object of this invention to provide a multiple wavelength spectrometer of much smaller size than has been available in the prior art. Other objects are to provide such a spectrometer which is relatively inexpensive, which employs very small filter elements, which has good stability, which may be expanded from two to several wavelengths, and which has a good signal/noise ratio. Other objects, features, and advantages will become apparent from the following description and appended claims.

SUMMARY OF THE INVENTION

There is provided a multiple wavelength spectrometer comprising a source of electromagnetic radiation and means for directing the radiation through a sample to be analyzed. Detector means are positioned for receiving radiation leaving the sample. Intermediate the source and the detector is a means for chopping the radiation at a first frequency. A plurality of filters is provided and means are provided for periodically and alternatively inserting each of the filters into the path of the radiation between the source and the detector for a time greater than the chopping period.

DESCRIPTION OF THE PREFERRED EMBODIMENT

Figure 1:
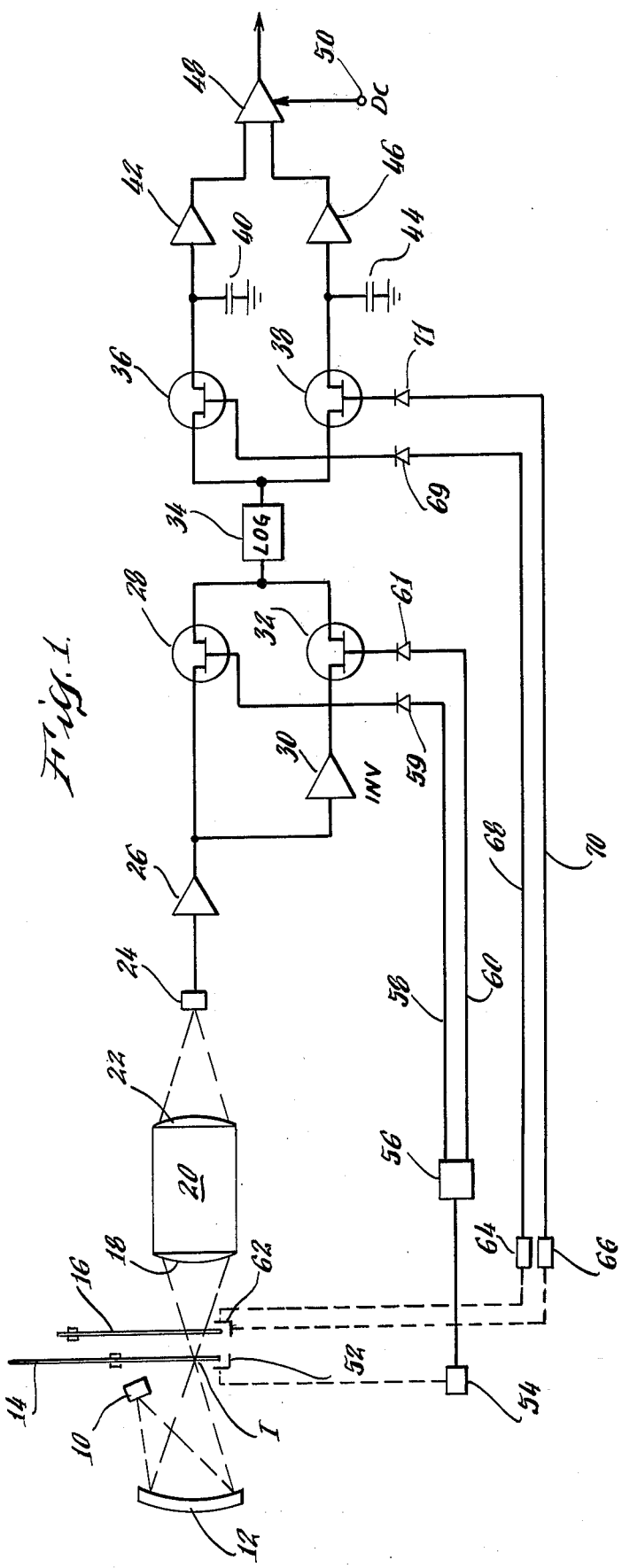
FIG. 1 is a schematic illustration of apparatus constructed in accordance with this invention.

With particular reference to FIG. 1 there is illustrated an infrared source 10 and a focusing mirror 12 positioned to form a source image I. At the image I there is positioned a rotating chopper 14 and a filter selector 16 both of which will be described in more detail infra. Infrared radiation leaving the chopper and filter passes through a collimating lens 18, sample cell 20, and focusing lens 22 where the source is re-imaged on an infrared detector 24. Detector 24 produces an electrical output proportional to the intensity of the infrared radiation falling thereon. The output of detector 24 passes through an a.c. amplifier 26 which feeds directly into a field effect switching transistor 28 and through an inverter 30 to a second field effect switching transistor 32. The outputs of both switching transistors are connected to the input of a logarithmic converter 34 and the output from converter 34 is connected to two field effect switching transistors 36, 38. The output of transistor 36 is connected to capacitor 40 and amplifier 42 while the output from transistor 38 is connected to capacitor 44 and amplifier 46. The outputs from both amplifiers are supplied to a difference amplifier 48 which receives an adjustable bias from a constant voltage source 50.

The chopper 14 includes an optical pickup 52 which produces a position reference signal by means of a light emitting diode and a phototransistor 54 mounted on opposite sides of the chopper. The output of the phototransistor 54 is converted by an isolation logic gate 56 to a gating signal on either of lines 58, 60 which are connected through diodes 59, 61 to the gates of switching transistors 28, 32. The filter selector 16 also includes a position reference pickup 62 which operates in similar fashion through phototransistors 64, 66 to apply a gating signal to either of lines 68, 70 which are connected through diodes 69, 71 to the gates of switching transistors 36, 38.

The actual construction of the filter and chopper of the assembly of the present invention will now be explained with reference to FIGS. 2 and 3. These figures illustrate a base plate 72 which defines an opening 74 for radiation passing from the source mirror to the sample. A suitable bracket 76 supports a back plate 78 which is spaced from and substantially parallel to the base plate 72. Supported therebetween by bearings 80 is a pivot pin 82 which carries a pendulum-like arm 84 from which extends rearwardly a camming pin 86. Extending from the lower end of the arm 84 is a relatively thin filter selector flag 16. Filter selector flag 16 defines a plurality of apertures 88, each of which is positioned to be aligned with the source image I when the selector is rotated about the pivot pin 82. Positioned over one or more of the apertures 88 is an interference filter 90.

Figure 2:
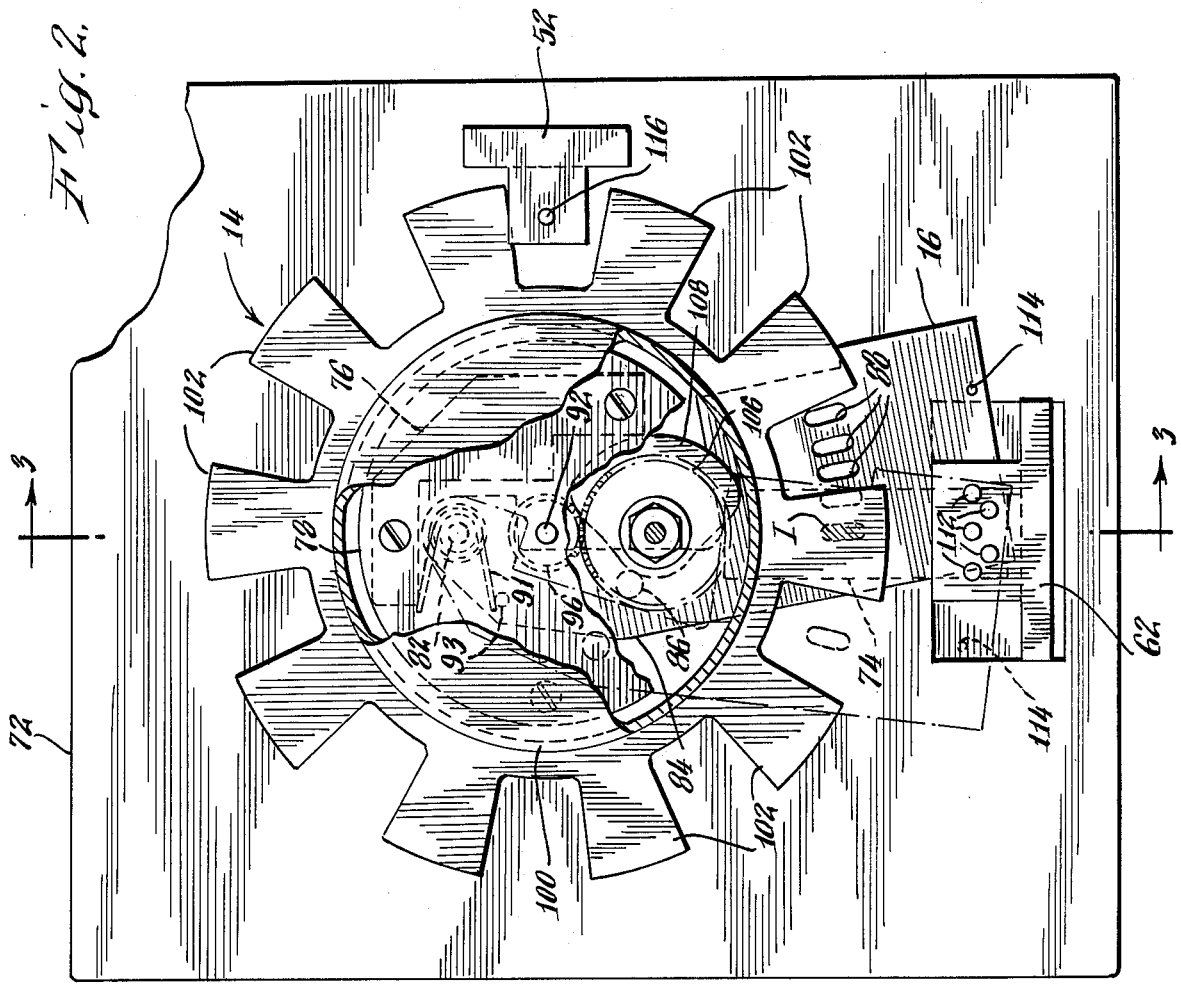
FIG. 2 is a front view of the chopper head of the invention with portions broken away to illustrate the internal construction.
Figure 3:
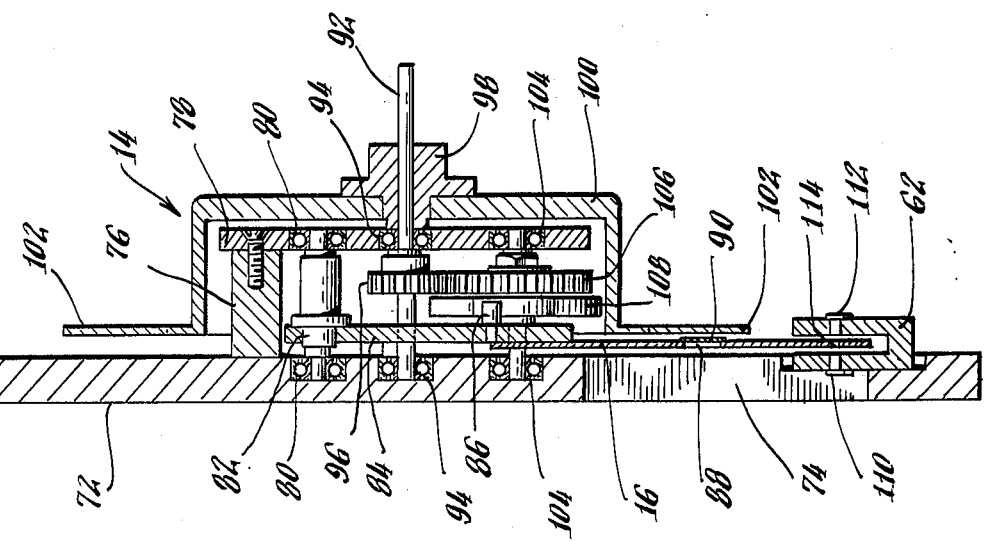
FIG. 3 is a cross section taken substantially along the line 3—3 of FIG. 2.

A torsion spring 91 is carried by pivot pin 82 with its ends bearing against a fixed stop and against a pin 93 on arm 84, thus tending to rotate arm 84 counterclockwise, as viewed in FIG. 2.

A drive shaft 92 is mounted for rotation in bearings 94 and carries an internal drive gear 96 and an external hub 98. Secured to hub 98 for rotation therewith is the chopper 14 which has a cup-shaped central body 100 carrying opaque blades 102 defining apertures therebetween. Mounted between bearings 104 is a cam gear 106 to which is secured a cam 108 in engagement with camming pin 86.

The filter position pickup 62 is mounted on the base plate 72 and carries one or more light emitting diodes 110 and a corresponding number of aligned phototransistors 112 positioned to sense reference openings 114 in the filter selector flag 16. The chopper pick up 52 is similarly constructed and carries a single light emitting diode (not shown) and a single phototransistor 116 positioned so that the blades 102 of the chopper pass therebetween.

In operation, the drive shaft 92 is driven from an external source (not shown) to rotate chopper 14 at the desired chopping frequency. It will be noted that cam 108 is a two position cam. When in the position illustrated in FIG. 2, the spring 91 keeps the filter selector flag 16 to the right as shown so that the extreme left one of apertures 88 and its corresponding filter are positioned at the source image I. This filter remains in the radiation beam until cam 108 is rotated by drive shaft 92 and the gears 96, 106 to the point where its high dwell portion depresses the camming pin 86 to the left, forcing the filter selector to the position showed by the dashed-dotted lines. In this position, the extreme right one of apertures 88, and its corresponding filter, are located at the source image I.

In the embodiment just described only two of apertures 88 are utilized. However, all five or any other desired number of filters may be employed by replacing cam 108 with one having five, or any other desired number of, dwell surfaces.

It will be apparent from the foregoing that the construction described above permits both the filter and the chopper to be placed substantially at the source image. Furthermore, the filter remains fixed and the cam is so positioned and timed as to change filters at a time when the image falls upon an opaque blade of the chopper. As a result, the filters may be quite small and, in practice, a number of such filters can be cut from a single interference filter blank.

Figure 4:
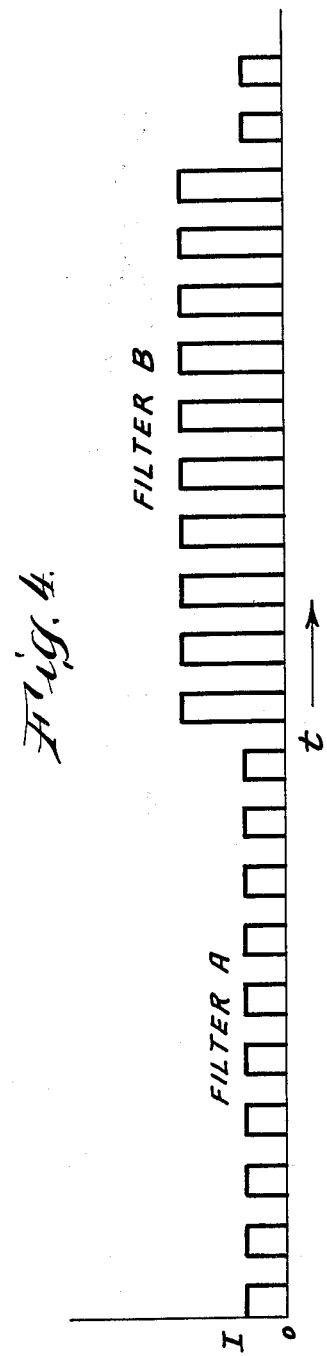
FIG. 4 is a diagram illustrating the waveshape produced by the detector of the invention.

Referring now to FIG. 4, there is shown the waveform produced by radiation from the apparatus of this invention falling upon the detector 24. It will be seen to comprise a series of chopped pulses varying in intensity in accordance with which of two filters (here denominated a and B) are in position. Referring to FIG. 1 these signals are amplified by the amplifier 26 and supplied to field effect switching transistor 28 and through an inverter 30 to field effect switching transistor 32. These transistors are gated by the chopper position reference pickup 52 whereby one of the transistors is caused to conduct when radiation is passed and the other is caused to conduct when radiation is blocked. Thus, these transistors form a demodulator and the demodulated output is passed through a logarithmic circuit 34.

The output of the logarithmic circuit 34 is supplied to switching transistors 36, 38, one of which is caused to conduct when one filter is in place while the other conducts when the other filter is in place. These transistors, in conjunction with storage capacitors 40 and 44, form "sample and hold" circuits. The d.c. voltages supplied to the amplifiers 42, 46 are proportional to the logarithms of the light intensities, although reversed in sign. Assuming that one of the radiation frequencies is an absorption frequency while the other is not, the difference amplifier 48 has an output which is a direct measure of sample absorbance. There is also provided a d.c. offset from source 50 which may be set to make the absorbance zero in the absence of a sample.

In the foregoing description, it has been assumed that only two filters are employed. If more are used, a separate phototransistor supplies a gating signal for each filter. These signals gate additional "sample and hold" circuits which parallel and duplicate those shown in FIG. 1.

It is believed that the many advantages of this invention will now be apparent to those skilled in the art. It will also be apparent that a number of variations and modifications may be made therein without departing from its spirit and scope. For example, the foregoing description has been primarily directed to a spectrometer including a radiation source and a sample cell. The invention, however, is not so limited. It may be employed equally well in a radiometer or emission spectrometer. In such a case, the instrument package would include an optical system for receiving the radiation and would not include a sample cell or radiation source. Accordingly, the foregoing description is to be construed as illustrative only, rather than limiting. This invention is limited only by the scope of the following claims.

I claim:

1. A multiple wavelength radiation analyzer which comprises: means for detecting electromagnetic radiation from a radiation source; a chopper intermediate said source and detecting means positioned to chop said radiation at a first frequency; means for supporting a plurality of filters is close spatial relationship to said chopper; and means driven by said chopper for positioning said supporting means to periodically, repetitively, and alternatively insert each of said filters into the path of said radiation between said source and detecting means for a preselected observation period greater than the chopping period and keeping each filter stationary during its respective observation period.

2. The analyzer of claim 1 wherein said supporting means comprises an oscillatory member having said filters thereon.

3. The analyzer of claim 1 wherein said chopper comprises a rotatable wheel having a plurality of opaque blades about its periphery.

4. The analyzer of claim 3 wherein said supporting means comprises an oscillatory member having said filters thereon; and said positioning means comprises camming means driven by said wheel for positioning said oscillatory member in response to the rotational position of said wheel.

5. The analyzer of claim 4 wherein said wheel includes a substantially cup-shaped central portion having said blades extending radially outward from its rim portion.

6. The analyzer of claim 5 wherein said oscillatory member is a relatively thin flag supporting said filters in close spatial relationship to said blades.

7. The analyzer of claim 6 wherein said camming means are substantially enclosed within the cup-shaped portion of said wheel.

8. A multiple wavelength spectrometer which comprises: a source of electromagnetic radiation; means for directing said radiation to a sample to be analyzed; means for detecting radiation leaving said sample; a chopper intermediate said source and detecting means positioned to chop said radiation at a first frequency; means for supporting a plurality of filters in close spatial relationship to said chopper; and means driven by said chopper for positioning said supporting means to periodically, repetitively, and alternatively insert each of said filters into the path of said radiation between said source and detecting means for a preselected observation period greater than the chopping period and keeping each filter stationary driving its respective observation period.

* * * * *